(12) United States Patent
Zhang

(10) Patent No.: US 7,843,810 B2
(45) Date of Patent: Nov. 30, 2010

(54) KEEPING MODEMS ONLINE UPON N+1 SWITCHOVER IN CABLE MODEM TERMINATION SYSTEMS

(75) Inventor: Daoyuan Zhang, Northborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 228 days.

(21) Appl. No.: 12/214,146

(22) Filed: Jun. 17, 2008

(65) Prior Publication Data
US 2009/0034594 A1 Feb. 5, 2009

Related U.S. Application Data

(60) Provisional application No. 60/952,852, filed on Jul. 30, 2007.

(51) Int. Cl.
H04L 12/24 (2006.01)
(52) U.S. Cl. .................. 370/217; 370/252; 375/222
(58) Field of Classification Search .............. None
See application file for complete search history.

(56) References Cited

U.S. PATENT DOCUMENTS

| | | | |
|---|---|---|---|
| 6,839,829 B1 | 1/2005 | Daruwalla et al. | |
| 7,035,251 B2 | 4/2006 | Hebsgaard et al. | |
| 7,058,007 B1 * | 6/2006 | Daruwalla et al. | 370/216 |
| 7,068,712 B1 * | 6/2006 | Zang et al. | 375/222 |
| 7,334,252 B1 * | 2/2008 | Millet et al. | 725/111 |
| 7,684,315 B1 * | 3/2010 | Beser | 370/219 |
| 2002/0066110 A1 * | 5/2002 | Cloonan et al. | 725/111 |
| 2002/0191684 A1 | 12/2002 | Min et al. | |
| 2003/0058892 A1 * | 3/2003 | Dworkin et al. | 370/498 |
| 2004/0034871 A1 | 2/2004 | Lu et al. | |
| 2004/0045033 A1 | 3/2004 | Cummings et al. | |
| 2004/0139473 A1 | 7/2004 | Greene | |
| 2004/0163120 A1 | 8/2004 | Rabenko et al. | |
| 2004/0202203 A1 | 10/2004 | Kolze et al. | |
| 2005/0097617 A1 * | 5/2005 | Currivan et al. | 725/111 |
| 2005/0251841 A1 | 11/2005 | Boyce et al. | |
| 2005/0254417 A1 * | 11/2005 | Walston | 370/216 |
| 2006/0013262 A1 * | 1/2006 | Downey et al. | 370/503 |
| 2006/0182148 A1 | 8/2006 | Hebsgaard et al. | |
| 2007/0140209 A1 | 6/2007 | Hebsgaard et al. | |
| 2009/0232111 A1 | 9/2009 | Li et al. | |

OTHER PUBLICATIONS

Notification of Transmittal of the International Search Report and the Written Opinion of the International Searching Authority, with International Search Report and Written Opinion attached, issued in PCT/US2009/001270, dated Sep. 30, 2009 (12 pages).

* cited by examiner

*Primary Examiner*—Min Jung
(74) *Attorney, Agent, or Firm*—Hamilton, Brook, Smith & Reynolds, P.C.

(57) ABSTRACT

According to a first aspect, in a time period after a line card switchover, a CMTS router makes each ranging opportunity in a bandwidth allocation map effectively wider by padding mute areas, which no modem can use, before and after a ranging opportunity. This is to keep a ranging packet of one modem from colliding with transmissions from other modems that may have incorrect timing offset after a switchover. According to a second aspect, the CMTS router sends a modem affected by a switchover one or more unsolicited requests to adjust its timing offset in an effort to keep the modem from going offline.

24 Claims, 8 Drawing Sheets

KEEPING MODEMS ONLINE UPON N+1 SWITCHOVER IN CABLE MODEM TERMINATION SYSTEMS

RELATED APPLICATION(S)

This application claims the benefit of U.S. Provisional Application No. 60/952,852, filed on Jul. 30, 2007.

The entire teachings of the above application(s) are incorporated herein by reference.

TECHNICAL FIELD

The present disclosure relates generally to cable modems and cable modem termination systems.

BACKGROUND

A cable modem network or "cable plant" employs cable modems, which are an improvement over conventional PC data modems and provide high speed connectivity. Digital data on upstream and downstream channels of the cable network is carried over radio frequency ("RF") carrier signals. Cable modems convert digital data to a modulated RF signal for upstream transmission and demodulate downstream RF signal to bit streams for use by computers. The conversion is done at a subscriber's home. At a cable modem termination system ("CMTS") located at a head end of the cable network, the conversions are reversed. The CMTS converts downstream digital data to a modulated signal, which is carried over the fiber and coaxial lines to the subscriber premises. On the return path, the CMTS receives the modulated upstream signal, which it demodulates and transmits to an external node. A current standard for transmission of data over cable networks is the Data-Over-Cable Service Interface Specification ("DOCSIS").

In earlier cable networks, there was no provision for any redundancy at the CMTS. Without redundancy, a failure of the one of the CMTS resulted in a service disruption or service outage of the cable modems relying upon the failed element. In such networks, the failed CMTS had to be repaired or replaced before service could resume. This meant that service could be out for an extended period. From the perspective of the service provider and the end user, any type of disruption or delay in service is extremely undesirable.

In a known system, an N+1 redundancy technique employs at least two CMTS interfaces (e.g., line cards) on one or more CMTS chassis at the head end of a cable network. One of the CMTSs serves as a backup or "protecting" CMTS. When another CMTS (a "working" CMTS) becomes unavailable to service its group of cable modems, the protecting CMTS takes over service to those cable modems. The protecting CMTS provides service on the same downstream and upstream channels as used by the working CMTS.

BRIEF DESCRIPTION OF THE DRAWINGS

Illustrated in the accompanying drawings are example embodiments in which like reference characters refer to the same parts throughout the different views. The drawings are not necessarily to scale, emphasis instead being placed upon illustrating example embodiments.

DESCRIPTION OF EXAMPLE EMBODIMENTS

An important requirement of N+1 redundancy for CMTS in the cable network is to keep working modems online during a switchover to the protection line card. During a switchover from a failed CMTS line card to a protection CMTS line card, the timing offset (i.e., round-trip delay from CMTS to modem) for the affected cable modems usually changes relative to the protection line card. This change in timing offset occurs because, even though the failed and protection CMTS line cards are likely co-located, the round-trip propagation delay changes due to physical differences in the cabling and in the line cards themselves. With the wrong timing offset, the CMTS is not able to correctly receive any data packets from the modems and, after a timeout period, the modems eventually go offline. This problem exists for cable modem transmission at any symbol rate, and is more severe when symbol rates are higher.

One known approach to address the problem is to compensate for the timing offset difference for an entire upstream channel, usually with hardware support. While this approach may keep some modems from going offline, in the case of an upstream channel that services hundreds or thousands of modems, such compensation for an entire upstream channel does not work very well, as significant numbers of modems can still go offline in a line card switchover.

Accordingly, in one aspect of the present approach, in a time period after a line card switchover (e.g., one minute) a CMTS router makes each ranging opportunity in a bandwidth allocation map effectively wider by padding mute areas (e.g., assigned as NULL SIDS), which no modem can use, before and after a ranging opportunity. This is to keep a ranging packet of one modem from colliding with transmissions from other modems that may have incorrect timing offset after a switchover. By arranging the bandwidth allocation so as to avoid such a collision, the CMTS router is more likely to receive the modem ranging packets and therefore keep such modems from going offline needlessly. However, the timing offset for some modems is likely to be so wrong, that even with such wider ranging opportunities, the CMTS router cannot receive ranging packets from these modems.

In cable networks today, the CMTS passively waits for the modem to timeout (e.g., 16 times) before considering the modem as offline. According to a second aspect of the present approach, the CMTS router sends a modem affected by a switchover one or more unsolicited requests to adjust its timing offset in an effort to keep the modem from going offline.

Figure 1:
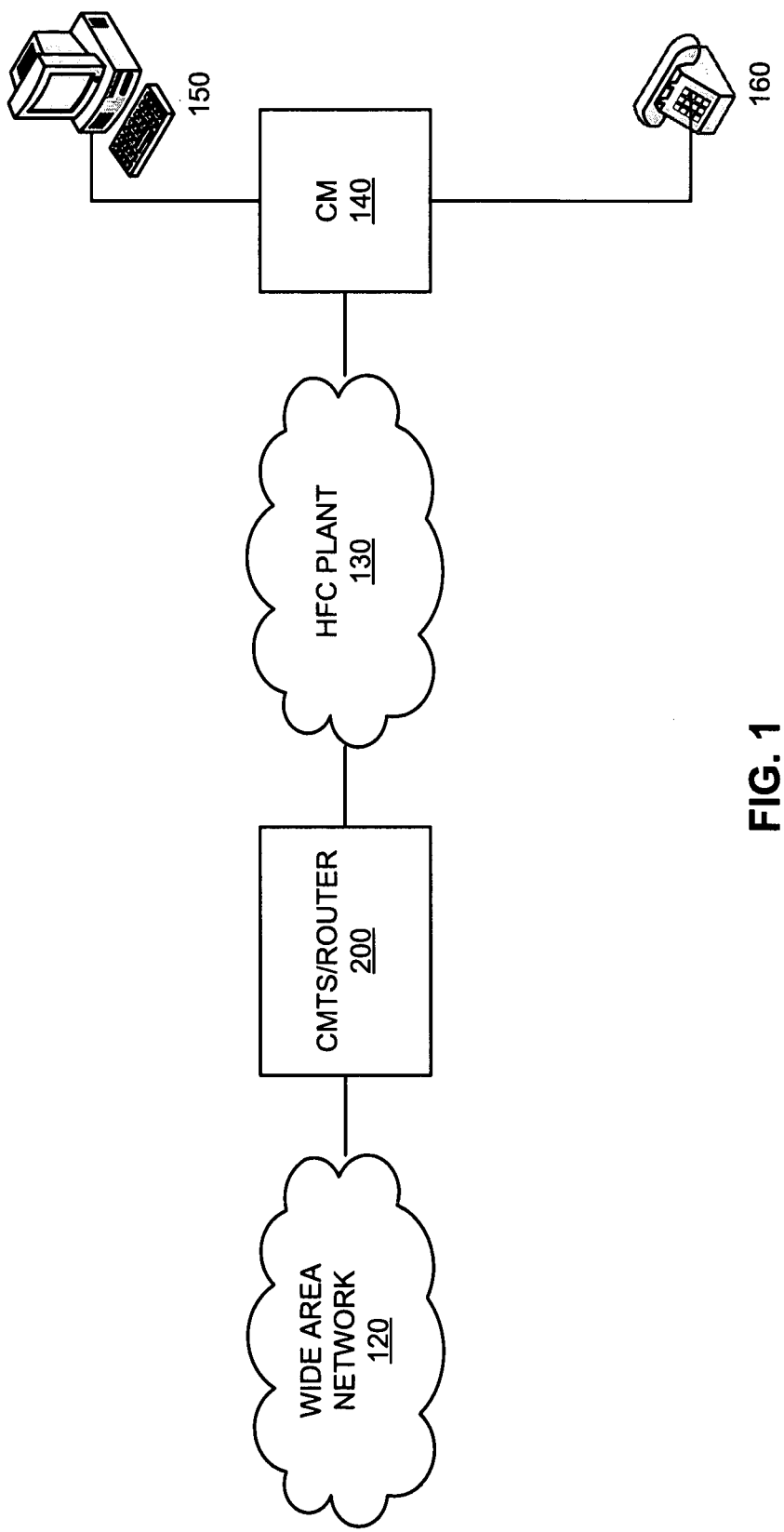
FIG. 1 illustrates an example cable network.

FIG. 1 illustrates an example two-way hybrid fiber-coaxial (HFC) cable network system. It shows a wide area network 120, CMTS router 200, HFC plant 130 and cable modem 140. Cable modem (CM) 140 is, in turn, connected to a subscriber computer 150 and telephony device 160. It should be understood that, while for simplicity only one CM is shown, there may be hundreds or thousands of CMs connected to the CMTS router in an example network configuration.

The CMTS (1) receives signals from the wide area network 120 and converts the format of those signals, e.g., microwave signals to electrical signals suitable for transmission over the HFC plant 130; (2) provides appropriate Media Access Control (MAC) level packet headers for data received by the cable system; and (3) modulates and demodulates the data to and from the HFC plant.

Figure 2:
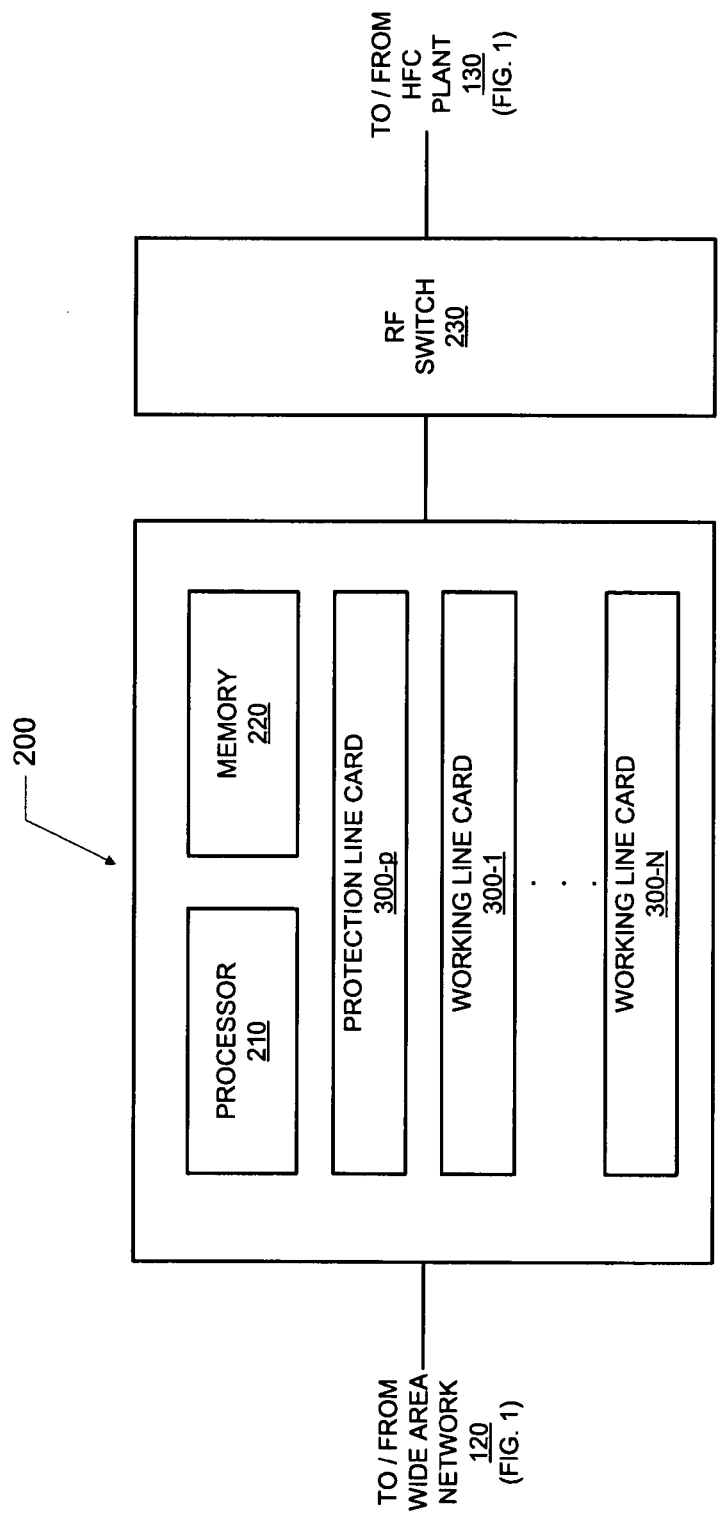
FIG. 2 illustrates an example CMTS router.

FIG. 2 illustrates an example CMTS router 200. The CMTS router includes processor 210, memory 220, protection CMTS line card 300-p, working CMTS line cards 300-1, . . . , 300-N, and RF switch 230. An example CMTS router is the Cisco uBR10012 Universal Broadband Router available from Cisco Systems, Inc. of San Jose, Calif. The RF switch 230 serves to connect the working and/or protection line cards to the HFC plant.

Figure 3:
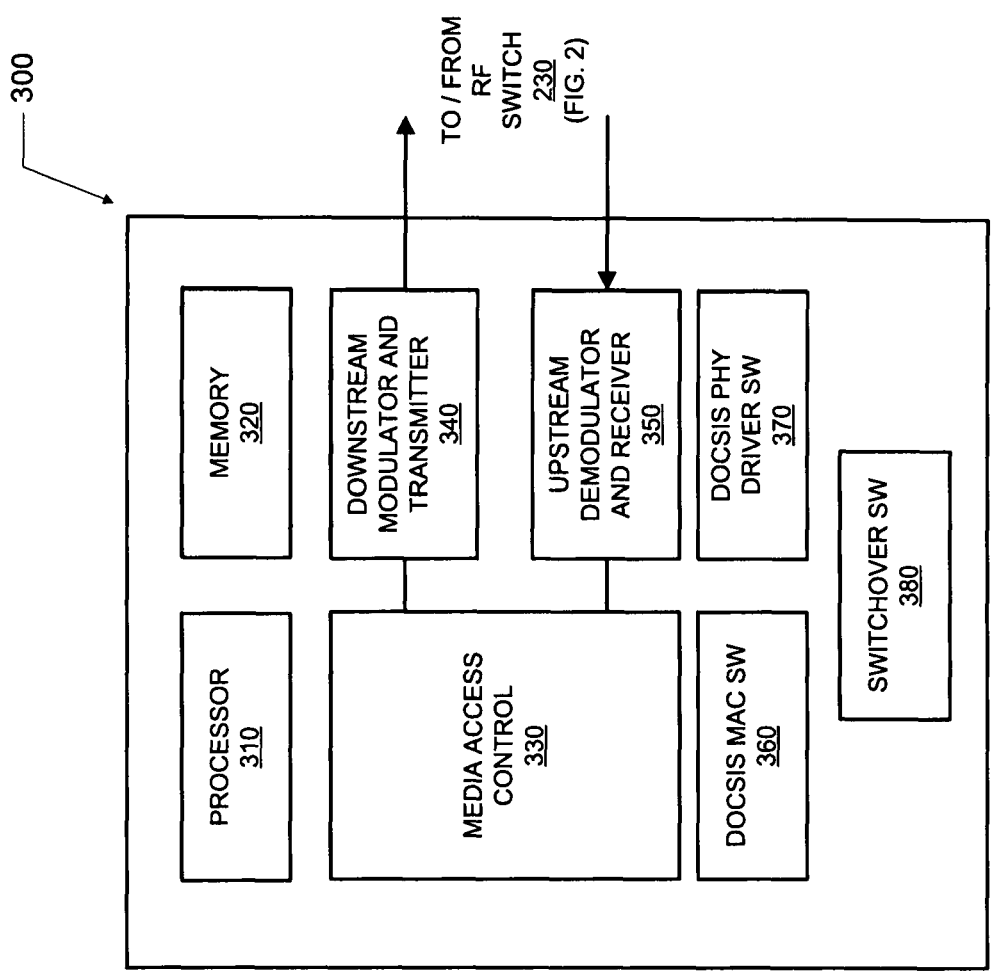
FIG. 3 illustrates an example CMTS line card.

FIG. 3 illustrates an example CMTS line card 300. In the specific embodiment as shown in FIG. 3, a CMTS line card 300 provides functions at the physical layer and Media Access Control (MAC) layer. Generally, the physical layer is responsible for receiving and transmitting RF signals on the cable plant. Hardware portions of the physical layer include a downstream modulator and transmitter 340 and an upstream demodulator and receiver 350. The physical layer also includes software 370 for driving the hardware components of the physical layer.

Upstream data signals (packets) arriving via the RF switch 230 are demodulated by the demodulator/receiver 350 and then passed to the MAC layer for processing. A primary purpose of the MAC layer is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information described in the "Data-Over-Cable Service Interface Specifications DOCSIS 2.0—Radio Interface Specifications" CM-SP-RFIv2.0-I07-041210, Dec. 10, 2004 which is incorporated herein by reference for all purposes.

The MAC headers include addresses to specific modems or to a hub (if sent upstream). Note that the cable modems also include MAC addressing components. In the cable modems, these components encapsulate upstream data with a header containing the MAC address of the hub. The MAC layer block includes a MAC hardware portion 330 and a MAC software portion 360, which together serve the above-described functions. After the MAC layer block has processed the upstream information, it is then passed to a network layer block for causing the upstream information packet to be switched to an appropriate data network interface on the CMTS router 200 (FIG. 2) not shown. The network layer may be included, for example, as part of the conventional router functions of the CMTS router 200. When a packet is received at the data network interface from an external source, switching software within the network layer passes the packet to the MAC layer. MAC block 330 then transmits information via a one-way communication medium to downstream modulator and transmitter 340. Downstream modulator and transmitter 340 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK.

As shown in FIG. 3, CMTS line card 300 includes a processor 310 and memory 320. These hardware components interact with software and other hardware portions of the various layers within the CMTS. They provide general purpose computing power for much of the software. Memory 320 may include, for example, I/O memory (e.g., buffers), program memory, shared memory, etc. The switchover functions of the present approach may be implemented in software portion 380. In one embodiment, the software entities 360, 370 and 380 are implemented as part of a network operating system running on CMTS 200 (FIG. 2). Of course, the switchover logic could reside in hardware, software, or some combination of the two.

The procedures employed by the working and protecting CMTSs during switchover are preferably performed at the MAC layer of the CMTS logic. Thus, in CMTS line card 300, most of the switchover operations may be performed by the hardware and software provided for the MAC layer.

Although the system shown in FIGS. 2 and 3 represents one specific CMTS architecture of the present approach, it is by no means the only CMTS architecture on which the present approach can be implemented. For example, other types of interfaces and media could also be used with the CMTS.

The cable network described herein in reference to the DOCSIS specification. It should be understood that the principles of the present approach to switchover may be applied to other communication protocols.

In the DOCSIS specification, the upstream channel is modeled as a stream of mini-slots. The CMTS generates a time reference for identifying these slots. The CMTS controls access to these slots by the cable modems, for example, by granting some number of contiguous slots to a CM for it to transmit data. The CM times its transmission so that the CMTS receives it in the time reference specified.

The basic mechanism for assigning bandwidth management is the allocation MAP, a MAC management message transmitted by the CMTS on the downstream channel which describes, for some interval, the uses for the upstream mini-slots. A given MAP typically describes some slots as grants for particular CMs to transmit data in, other slots are available for contention transmission, and other slots as an opportunity for new CMs to join the network. Each CM has one or more short (14-bit) service identifiers (SIDs) as well as a 48-bit MAC address.

The allocation MAP includes a variable number of information elements (IEs) that each define an allowed usage for a range of mini-slots. Each IE includes a service identifier (SID). A broadcast SID is intended for all CMs. A unicast SID is intended for a particular CM. Each CM has one or more SIDs as well as a 48-bit address. A null SID is addressed to no CM.

An initial Maintenance IE when used with the broadcast SID provides an interval in which new CMs may join the network. A long interval, equivalent to the maximum round-trip propagation delay plus the transmission time of Ranging Request (RNG-REQ) message is provided to allow new CMs to perform initial ranging. A Station Maintenance IE provides an interval in which CMs are expected to perform some aspect of routine network maintenance, such as ranging or power adjustment.

To compensate for large delays in the cable network, the CMs are required to time their transmissions precisely to arrive at the CMTS at the start of an assigned mini-slot. To accomplish this, two pieces of information are needed at each CM: 1) a global timing reference sent downstream from the CMTS to all CMs and 2) a timing offset, calculated during a ranging process, for each CM. The broadcast initial ranging process is used to provide initial ranging for the individual CMs. Subsequently, each CM waits for an individual Station Maintenance region and transmits a ranging request message. The CMTS returns a ranging response message to the CM with an fine tuning of the timing offset. The ranging request/ response steps are repeated until the response contains a ranging successful notification or the CMTS aborts ranging. Once successfully ranged, the CM may join normal data traffic in the upstream. Periodically, a ranging opportunity is provided to the CMs so as to keep the CM ranged.

Figure 4:
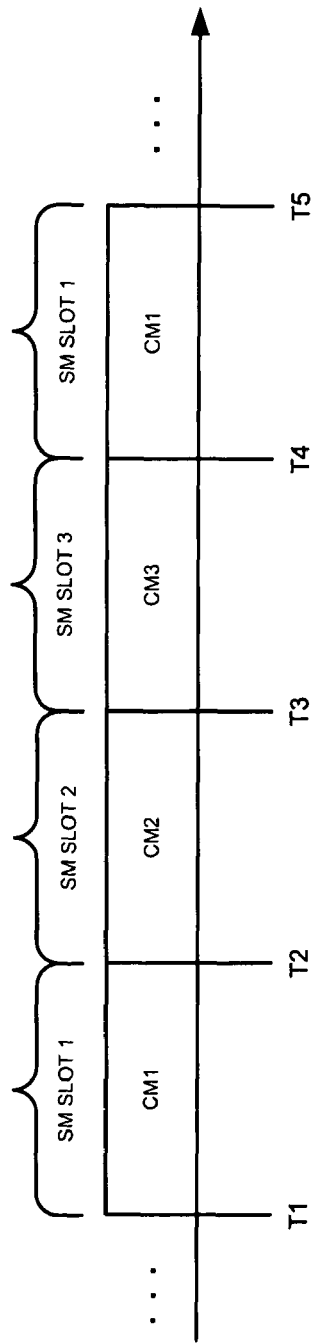
FIG. 4 illustrates ranging timing.

FIG. 4 illustrates ranging timing as received at the CMTS for a portion of slots allocated by a MAP allocation message. As shown, transmission for Station Maintenance messages from a first CM (CM1) starts to arrive at time T1 and ends at time T2. These are referred to as SM slots. At time T2, the transmission from a second CM (CM2) starts to arrive and ends at time T3. The transmission from a third CM (CM3) starts to arrive at T3 and ends at time T4. The next transmission from the first CM (CM 1) starts at time T4 and ends at time T5, and so on.

Figure 5:
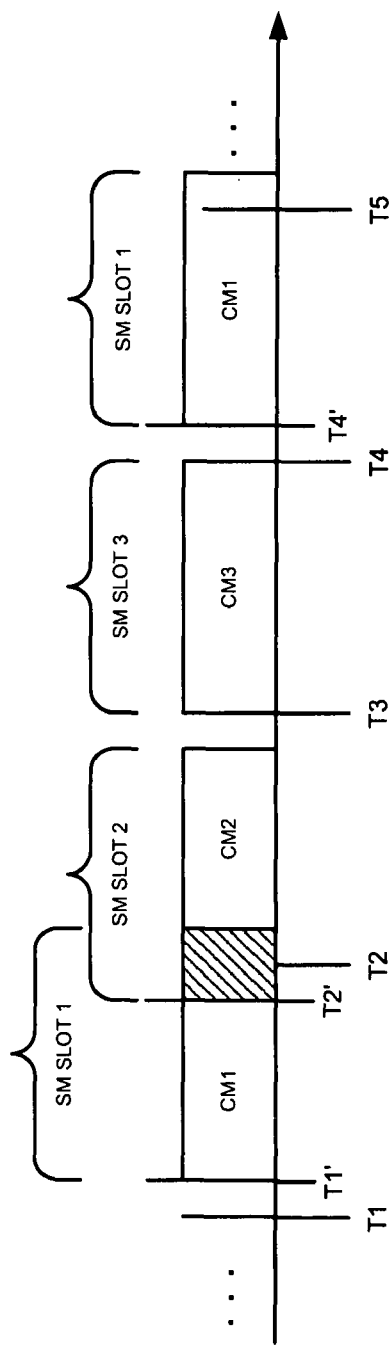
FIG. 5 illustrates ranging timing after switchover to a CMTS protection line card.

FIG. 5 illustrates ranging timing after switchover to a CMTS protection line card. In this case, each cable modem timing offset is likely to change by differing amounts. In the illustrated example, assume the timing offset for CM1 increases and the timing offset decreases for CM2. The transmission from CM1 arrives at time T1', which is later than time T1. The transmission from CM2 arrives at time T2', which is earlier than T2. Thus, a portion of the transmissions for CM1 and CM2 collide. Because of the collision, the transmissions do not arrive at the expected time at the CMTS, and the ranging is missed. After a number of such misses, (16 is default), the CMs (CM1 and CM2) go offline.

Figure 6:
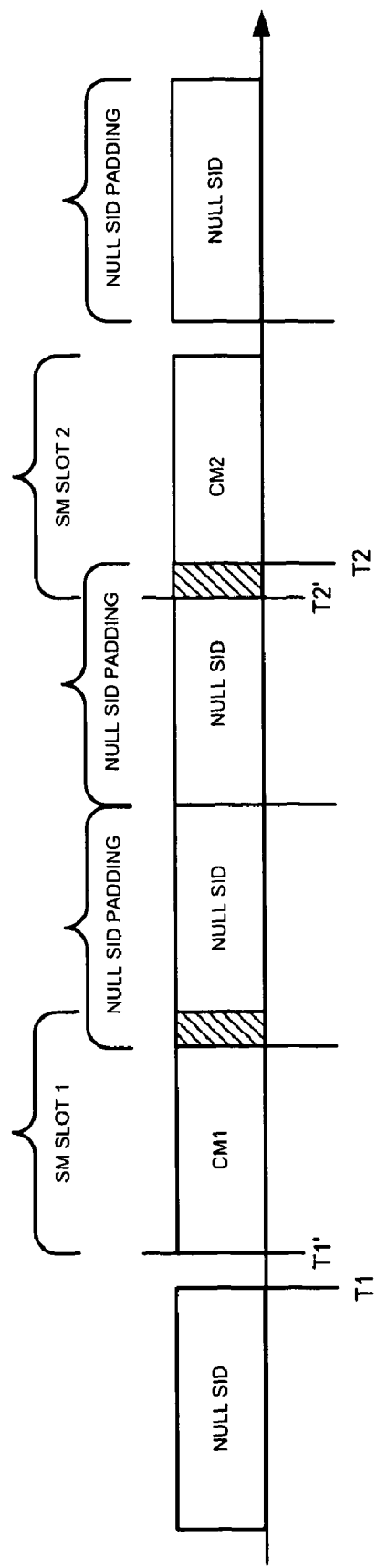
FIG. 6 illustrates ranging timing with null padding after switchover.

Since a goal is to not miss the ranging even if the timing offset changes, a solution is to add padding of NULL SID allocations around the assigned SM slots within a short time period (e.g., one minute) of the switchover event. As shown in FIG. 6, NULL SID padding is added before and after each allocated SM slot. Though actual arrivals at the CMTS are still different than expected, there is no collision. Because the CMTS has some tolerance for arrivals at different times, some CMs can be kept online with this padding approach.

Figure 7:
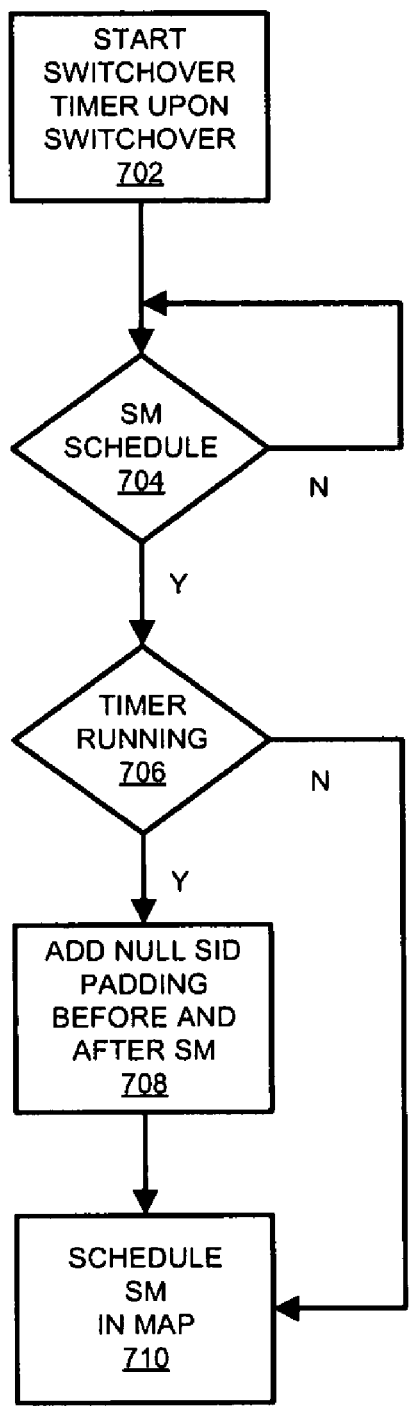
FIG. 7 illustrates a process for adding null padding after switchover.

FIG. 7 illustrates a process for adding null padding after switchover in accordance with the present approach. A timer is started (e.g., 3 minutes) upon switchover at 702. A check is made at 704 to determine if Station Maintenance scheduling is to occur. When scheduling Station Maintenance in the MAP allocation is to occur, a check is made to see if the timer is active at 706. If so, then the NULL SID (e.g., 4 mini-slots) is added before and after the SM slot at 708. If the timer is not active, then the padding is skipped. The SM is scheduled in the MAP at 710.

Figure 8A:
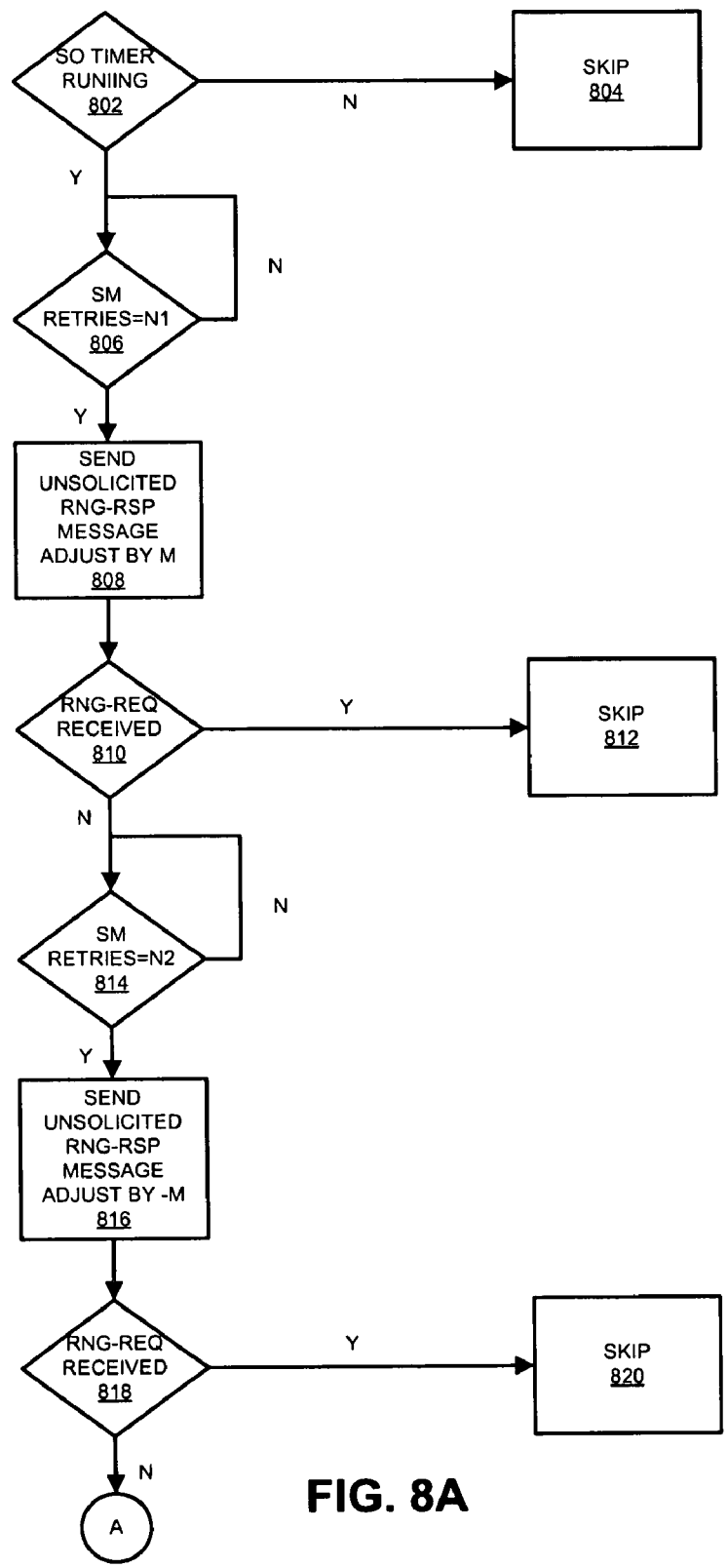
FIGS. 8A and 8B illustrate a process for adjusting timing offset after switchover.
Figure 8B:
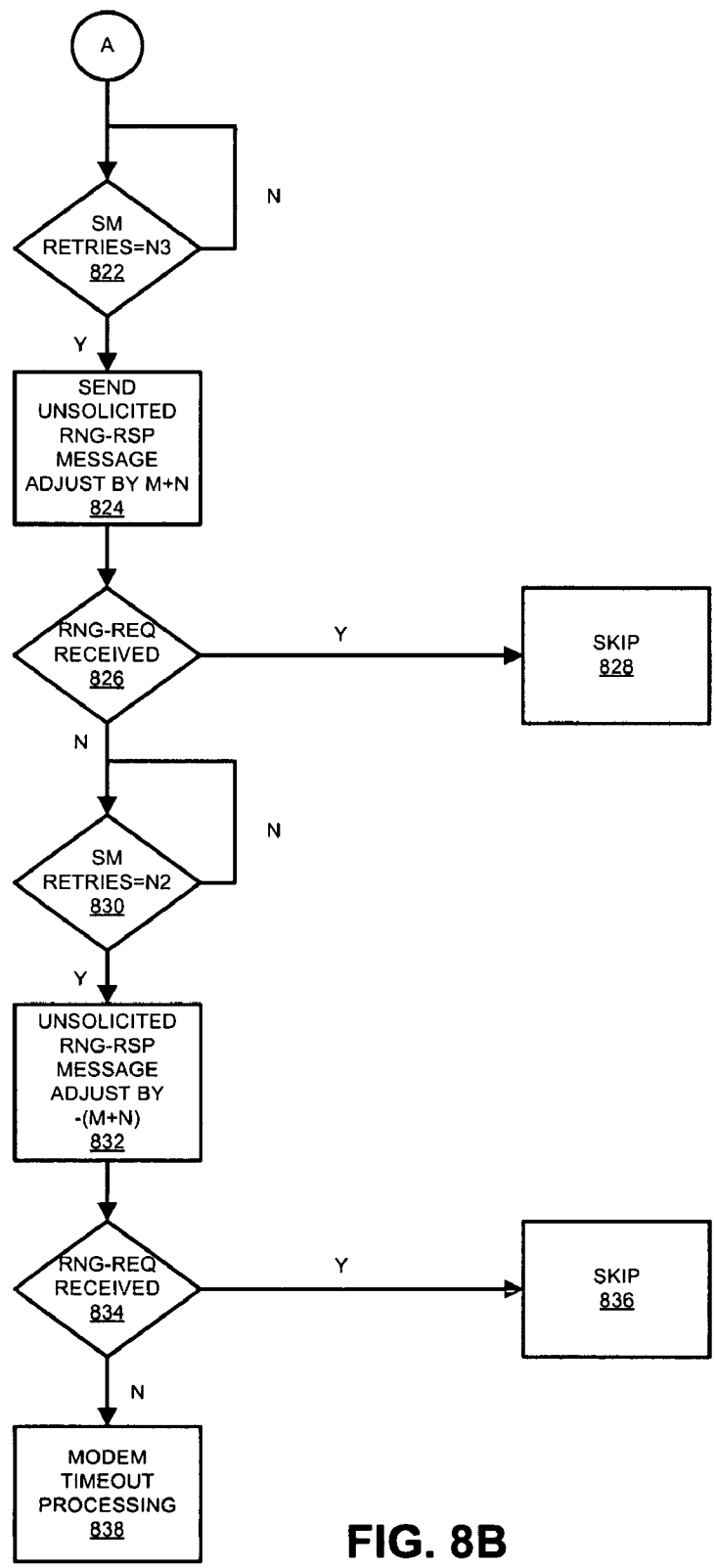

Even with the padding technique described above, the timing offset after switchover for some modems is still incorrect by too much. FIGS. 8A and 8B illustrate a process for adjusting timing offset after switchover to attempt to keep such a modem online even if its timing offset has changed too much for the padding technique to be effective. In accordance with the present approach, the CMTS sends one or more unsolicited range response (RNG-RSP) messages to the CM to allow the CM to try a different timing offset. In an embodiment, the unsolicited range response messages are sent only in a relatively short period after switchover. For example, the timer may be set to 3 minutes. In an embodiment, the timer may be the same timer that is used to control the padding technique.

Referring now to FIG. 8A, at 802 a check is made to determine if the switchover timer is running. If the timer is not running, then the process is skipped at 804. If the timer is running, then a check is made at 806 to determine whether the number of retries or timeouts has reached a selected number N1. If the number of retries equals N1, then at 808 the CMTS sends an unsolicited RNG-RSP message to the CM. The RNG-RSP message includes a timing offset value equal to M.

At 810 a check is made to determine whether a range request (RNG-REQ) message has been received from the CM. If a RNG-REQ is received, then at 812 the process is skipped or ended. Otherwise, the process continues and at 814 a check is made to determine whether the number of retries or timeouts has reached a selected number N2.

If the number of retries equals N2, then at 816 the CMTS sends an unsolicited RNG-RSP message to the CM. The RNG-RSP message includes a timing offset value equal to −M. At 818 a check is made to determine whether a RNG-REQ message has been received from the CM. If a RNG-REQ is received, then at 820 the process is skipped or ended. Otherwise, the process continues and at 822 a check is made to determine whether the number of retries or timeouts has reached a selected number N3.

If the number of retries equals N3, then at 824 the CMTS sends an unsolicited RNG-RSP message to the CM. The RNG-RSP message includes a timing offset value equal to M+N. At 826 a check is made to determine whether a RNG-REQ message has been received from the CM. If a RNG-REQ is received, then at 828 the process is skipped or ended. Otherwise, the process continues and at 830 a check is made to determine whether the number of retries or timeouts has reached a selected number N4.

If the number of retries equals N4, then at 832 the CMTS sends an unsolicited RNG-RSP message to the CM. The RNG-RSP message includes a timing offset value equal to −(M+N). At 834 a check is made to determine whether a RNG-REQ message has been received from the CM. If a RNG-REQ is received, then at 836 the process is skipped or ended. Otherwise, the process concludes with normal CM timeout processing at 838.

In an embodiment, the units of M are 1/10 of a microsecond. It has been found that setting M and N to 4 works well, though values for M and N can be fine tuned for best results after testing the CMTS with large numbers of modems. The units of adjustment may be specified relative to the modem's original timing offset prior to the switchover. With respect to retries, N1 through N4 are selected between 1 and 16 in an embodiment. It should be understood that while the number of iterations described with respect to FIGS. 8A-8B is four, other numbers of iterations may be selected.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:

in a processor:

following a subject cable modem being switched over to a protecting cable modem termination system, adjusting a transmit parameter of the subject cable modem with a bandwidth allocation map that adds a null period before and after a station maintenance period so that a ranging request sent from the subject cable modem is received by the protecting cable modem termination system outside of a period used by an other cable modem for upstream communication.

2. The method of claim 1 wherein adjusting the transmit parameter occurs during a given period of time following the subject cable modem being switched over to the protecting cable modem termination system.

3. A method comprising:

in a processor:

following a subject cable modem being switched over to a protecting cable modem termination system, adjusting a time when the subject cable modem sends a ranging request, the time adjusted with a timing offset from an unsolicited ranging response so that the ranging request is received during a station maintenance period for the subject cable modem.

4. The method of claim 3 wherein adjusting the time includes advancing the time the subject cable modem sends the ranging request, the time advanced with a positive timing offset.

5. The method of claim 3 wherein adjusting the time includes delaying the time the subject cable modem sends the ranging request, the time delayed with a negative timing offset.

6. The method of claim 3 wherein adjusting the time includes advancing and delaying alternately the time the subject cable modem sends the ranging request, the time advanced and delayed in an alternating manner with a positive timing offset and a negative timing offset, respectively.

7. The method of claim 3 wherein adjusting the time includes advancing and delaying incrementally the time the subject cable modem sends the ranging request, the time advanced and delayed in an incremental manner with a positive increment to the timing offset and a negative increment to the timing offset, respectively.

8. The method of claim 3 wherein adjusting the time occurs during a given period of time following the subject cable modem being switched over to the protecting cable modem termination system.

9. The method of claim 3 wherein adjusting the time occurs for a given number of tries at receiving the ranging request during the station maintenance period.

10. An apparatus comprising:

an adjusting unit to adjust, following a subject cable modem being switched over to a protecting cable modem termination system, a transmit parameter of the subject cable modem with a bandwidth allocation map that adds a null period before and after a station maintenance period so that a ranging request sent from the subject cable modem is received by the protecting cable modem termination system outside of a period used by an other cable modem for upstream communication; and a transmitter to send to the subject cable modem the transmit parameter adjusted by the adjusting unit.

11. The apparatus of claim 10 wherein the adjusting unit adjusts the transmit parameter during a given period of time following the subject cable modem being switched over to the protecting cable modem termination system.

12. An apparatus comprising:

an adjusting unit to adjust, following a subject cable modem being switched over to a protecting cable modem termination system, a time when the subject cable modem sends a ranging request, the time adjusted with a timing offset from an unsolicited ranging response so that the ranging request is received by the protecting cable modem termination system during a station maintenance period for the subject cable modem; and a transmitter to send to the subject cable modem the unsolicited ranging response having the timing offset adjusted by the adjusting unit.

13. The apparatus of claim 12 wherein the adjusting unit advances the time the subject cable modem sends the ranging request, the time advanced with a positive timing offset.

14. The apparatus of claim 12 wherein the adjusting unit delays the time the subject cable modem sends the ranging request, the time delayed with a negative timing offset.

15. The apparatus of claim 12 wherein the adjusting unit advances and delays alternately the time the subject cable modem sends the ranging request, the time advanced and delayed in an alternating manner with a positive timing offset and a negative timing offset, respectively.

16. The apparatus of claim 12 wherein the adjusting unit advances or delays incrementally the time the subject cable modem sends the ranging request, the time advanced and delayed in incremental manner with a positive increment to the timing offset and a negative increment to the timing offset, respectively.

17. The apparatus of claim 12 wherein the adjusting unit adjusts the time during a given period of time following the subject cable modem being switched over to the protecting cable modem termination system.

18. The apparatus of claim 12 wherein the adjusting unit adjusts the time during a given number of tries at receiving the ranging request during the station maintenance period.

19. Logic encoded in one or more tangible, non-transitory media for execution and when executed operable to:

following a subject cable modem being switched over to a protecting cable modem termination system, adjust a transmit parameter of the subject cable modem with a bandwidth allocation map that adds a null period before and after a station maintenance period so that a ranging request sent from the subject cable modem is received by the protecting cable modem termination system outside of a period used by an other cable modem for upstream communication.

20. A method comprising:

in a processor:

following a subject cable modem being switched over to a protecting cable modem termination system, adjusting a transmit parameter of the subject cable modem so that a ranging request sent from the subject cable modem is received by the protecting cable modem termination system outside of a period used by an other cable modem for upstream communication, wherein adjusting the transmit parameter includes adjusting a time that the subject cable modem sends the ranging request, the time adjusted with a timing offset from an unsolicited ranging response.

21. The method of claim 20 wherein adjusting the transmit parameter occurs during a given period of time following the subject cable modem being switched over to the protecting cable modem termination system.

22. An apparatus comprising:

an adjusting unit to adjust, following a subject cable modem being switched over to a protecting cable modem termination system, a transmit parameter of the subject cable modem so that a ranging request sent from the subject cable modem is received by the protecting cable modem termination system outside of a period used by an other cable modem for upstream communication wherein the adjusting unit adjusts a time that the subject cable modem sends the ranging request, the time adjusted with a timing offset from an unsolicited ranging response; and a transmitter to send to the subject cable modem the transmit parameter adjusted by the adjusting unit.

23. The apparatus of claim 22 wherein the adjusting unit adjusts the transmit parameter during a given period of time following the subject cable modem being switched over to the protecting cable modem termination system.

24. Logic encoded in one or more tangible, non-transitory media for execution and when executed operable to:

following a subject cable modem being switched over to a protecting cable modem termination system, adjust a transmit parameter of the subject cable modem so that a ranging request sent from the subject cable modem is received by the protecting cable modem termination system outside of a period used by an other cable modem for upstream communication wherein adjusting the transmit parameter includes adjusting a time that the subject cable modem sends the ranging request, the time adjusted with a timing offset from an unsolicited ranging response.

* * * * *